United States Patent
Takezawa

[19]

[11] Patent Number: 6,002,532
[45] Date of Patent: Dec. 14, 1999

[54] LENS BARREL

[75] Inventor: Kazumitsu Takezawa, Yokohama, Japan

[73] Assignee: Nikon Corporation, Tokyo, Japan

[21] Appl. No.: 09/089,135

[22] Filed: Jun. 2, 1998

[30] Foreign Application Priority Data

Jun. 3, 1997 [JP] Japan .................................. 9-159299

[51] Int. Cl.$^6$ .................................................. G02B 15/14
[52] U.S. Cl. ........................................... 359/701; 359/696
[58] Field of Search .................................. 359/696, 701; 396/131, 137

[56] References Cited

U.S. PATENT DOCUMENTS 4,796,045 1/1989 Hamanishi et al. ..................... 396/137
5,229,800 7/1993 Kanno et al. ............................ 396/137

*Primary Examiner*—Georgia Epps
*Assistant Examiner*—Ricky Mack
*Attorney, Agent, or Firm*—Morgan, Lewis & Bockius LLP

[57] ABSTRACT

There is disclosed a lens barrel which comprises a supporting frame for supporting lens groups, a cam barrel to be rotated around the optical axis to move the supporting frame in the direction of the optical axis in a predetermined range, a manual focusing ring to which the operator supplies a manual power, a manual power transmission mechanism to be moved by the manual power supplied to the manual focusing ring to rotate the cam barrel, a first limitation member for inhibiting the power transmission from the manual focusing ring to the cam barrel by limiting the movement of the manual power transmission mechanism when the supporting frame is moved to a vicinity of one end of the predetermined range by the rotation of the cam barrel, a motor power transmission mechanism for transmitting the motive power supplied from the motor to the cam barrel so as to rotate the cam barrel, and a second limitation member for limiting the rotation of the cam barrel, wherein the second limitation member is provided at a position for limiting the rotation of the cam barrel at the same time as or after the first limitation member limits the movement of the manual power transmission mechanism while the supporting frame is moving toward one end of the predetermined range.

8 Claims, 3 Drawing Sheets

LENS BARREL

This application claims the benefit of Japanese Patent Application No. 9-159299 which is hereby incorporated by reference.

BACKGROUND OF THE INVENTION

1. Field of the Invention

The present invention relates to a lens barrel, and particularly, to a lens barrel in which a limitation is set on a rotation of a cam barrel.

2. Related Background Art

In a lens barrel mounted on the body of a camera, a focusing operation for moving lens groups in the direction of the optical axis is performed in order to bring a distant object into focus. Such focusing operation is conducted by a photographer or an operator by rotating a manual focusing ring which is provided in the lens barrel. When the manual focusing ring is rotated, the cam barrel in the lens barrel is rotated, whereby the lens group is moved in the direction of the optical axis through the cam mechanism.

Recently, such a lens barrel has been developed and already put on the market, which enables automatic focusing for moving the lens group with a motive power from a motor incorporated, for example, in the camera body while enabling the manual focusing mentioned above. Such lens barrel which is capable of automatic focusing is provided with a coupler member for receiving a motive power from the motor in the camera body, and the motive power supplied through the coupler member is used to rotate the cam barrel, thereby moving the lens group in the direction of the optical axis.

FIG. 3 is a cross-sectional view of the lens barrel of such conventional technique in the direction of the optical axis. Referring to FIG. 3, a cam barrel 2 which has a cam groove 2a is fitted in the outer periphery of a fixed barrel 1 to be freely rotatable. An outer fixed barrel 3 is fixed to the fixed barrel 1 with a screw 13. A manual focusing ring 4 is attached to the tip end of the outer fixed barrel 3 to be freely rotatable.

One end of an interlocking member 5 which serves as a manual power transmission mechanism is attached to the manual focusing ring 4 with a screw 45. Two interlocking members 5 which are provided in upper and lower parts symmetrically with the optical axis therebetween are two plate-like members which are extended toward the camera side. The tip end 5a of each interlocking member 5 is engaged between two projected portions 2b (only one is shown) which are formed in parallel in the circumferential direction on the outer peripheral of the cam barrel 2. That is, the interlocking members 5 function to couple the manual focusing ring 4 and the cam barrel 2 for rotating together.

A coupler member 8 is provided adjacent to the lower interlocking member 5 and is supported to be freely rotatable with respect to the fixed barrel 1. The coupler member 8 as a motor power transmission mechanism is provided with a gear portion 8a at the left end thereof and a connecting portion 8b at the right end. The connecting portion 8b can be freely engaged with a driving portion (not shown) projected from the camera body. The gear portion 8a of the coupler member 8 is meshed with a gear portion 2c which is formed on the outer periphery of the cam barrel 2.

A lens moving frame 6 serving as a supporting frame supports lens groups L1, L2 and is fitted in the fixed barrel to be movable along the optical axis. A pair of pins 7 are attached to the outer periphery of the lens moving frame 6 and fitted in a straight advancement groove 1a formed in the fixed barrel 1 and a cam groove 2a formed spirally on the cam member 2, respectively.

An operation of the lens barrel according to the prior art will be described below. First, when the photographer rotates the manual focusing ring 4, the cam barrel 2 is rotated as stated, and the lens moving frame 6 moves straight along the optical axis, whereby a manual focusing operation is conducted.

On the other hand, when an automatic focusing operation is conducted, the coupler member 8 which is mounted on the fixed barrel 1 to be freely rotatable rotates, upon receiving a motor drive from the camera body (not shown), the cam barrel 2 around the optical axis through the gear portion 8a provided in the coupler member 8 and the gear portion 2c engaged therewith, thereby moving the lens moving frame 6 in the direction of the optical axis.

Incidentally, since the manual power of the photographer is comparatively strong, when the manual focusing ring 4 is rotated carelessly toward the end of movement of the lens moving frame 6 (e.g. to the infinity position of the photographing lens), a large load is applied to the interlocking member 5 or the cam mechanism so that deformation or destruction of such member or mechanism may be brought about. For this reason, the manual focusing ring 4 usually has a rotation limit for preventing a rotation by not less than a predetermined angle.

More specifically, a projection 3a is formed to project inward in a direction perpendicular to the optical axis. It is arranged that a vicinity of an installing portion of the interlocking member 5 (that is, a portion of the interlocking member 5 at which an end thereof is attached to the manual focusing ring 4 with the screw 45) is brought into contact with such projection 3a, so as to limit a rotation of the manual focusing ring 4. Since the vicinity of the installing portion of the interlocking member 5 has a comparatively high rigidity, if the projection 3a is brought into contact therewith under great pressure, the interlocking member 5 is hardly deformed.

On the other hand, it is arranged that, when the automatic focusing operation is performed, the interlocking member 5 is rotated integrally with the cam barrel 2 upon receiving a motive power therefrom, so that when the interlocking member 5 is brought into contact with the projection 3a, further rotation of the cam barrel 2 is limited.

The interlocking member 5 is a plate-like member having the width of 5 mm to 10 mm and is fixed to the manual focusing ring 4 in a cantilever manner and, therefore, comparatively flexible. As a result, even if the manual focusing ring 4 is stopped, the tip end 5a thereof is movable to some extent based on such flexibility. Also, in a power transmission path from the interlocking member 5 to the coupler member 8, there are present a variety of power transmitting elements which are engaged with each other, so that a large backlash may be generated when backlashes between the elements are accumulated, even if each backlash is small.

Accordingly, if the interlocking member 5 is brought into contact with the projection 3a of the fixed barrel 3 when the automatic focusing is operated, the coupler member 8 is not stopped immediately, but is rotated to some extent based on the above-mentioned deformation or backlash of the components, which is called the excessive rotation. However, since the lens moving frame 6 has already reached the moving end, if the coupler member 8 is rotated further, an angle of rotation of the coupler member 8 and an amount of the movement of the lens moving frame 6 are not corresponding to each other, so that the subsequent automatic focusing control may be erroneous. In addition, if the coupler member 8 is excessively rotated, the components of the lens barrel may be interfered with each other.

On the other hand, it is possible to suppress the excessive rotation of the coupler member 8 by enhancing the deflection rigidity of the interlocking member 5, for example. However, in order to enhance the deflection rigidity of the interlocking member 5, it is required to enlarge the cross-sectional form of the interlocking member 5, which brings about enlargement of the lens barrel.

SUMMARY OF THE INVENTION

Taking these problems into consideration, the present invention aims to provide a lens barrel which has a compact structure and an enhanced accuracy in the automatic focusing control.

According to the present invention, there is provided a lens barrel which comprises a supporting frame for supporting lens groups, a cam barrel to be rotated around the optical axis for moving the supporting frame in the direction of the optical axis, a manual focusing ring to which the operator supplies a manual power, a manual power transmission mechanism for transmitting the manual power supplied to the manual focusing ring to the cam barrel, a first limitation member for inhibiting the power transmission from the manual focusing ring to the cam barrel by limiting a movement of the manual power transmission mechanism, a motor power transmission mechanism for transmitting the motive power supplied from the motor to the cam barrel, and a second limitation member for limiting rotation of the cam barrel at the same time as or later than the time when said second limitation member limits the rotation of said cam barrel.

According to the lens barrel of the present invention, when the second limitation member for limiting the rotation of the cam barrel receives the motive power from the motor power transmission mechanism even if there is deformation, backlash, or the like, of the manual power transmission mechanism, the second limitation member limits the rotation of the cam barrel, thereby suppressing or preventing the excessive rotation of the cam barrel.

DESCRIPTION OF THE PREFERRED EMBODIMENTS

Figure 1:
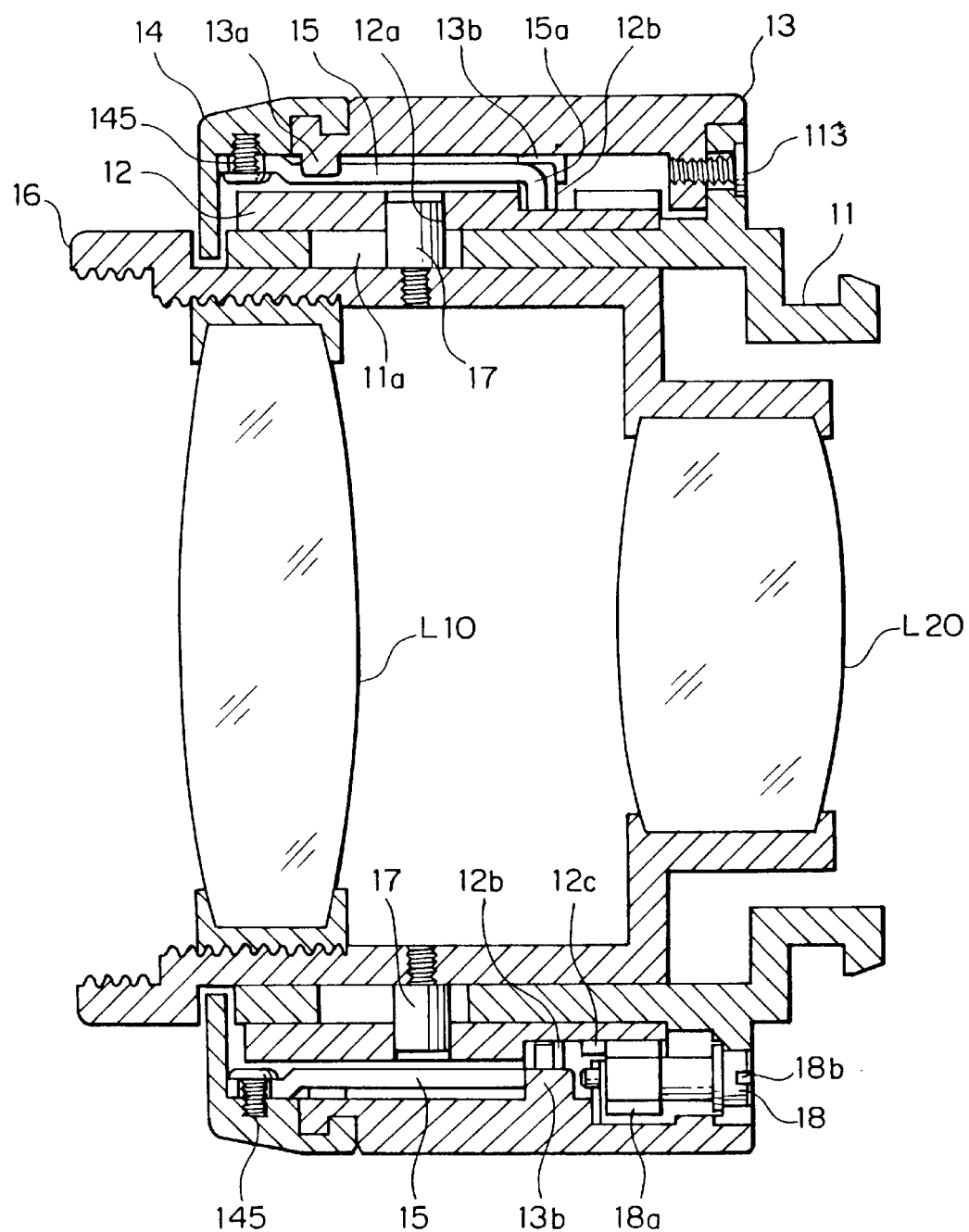
FIG. 1 is a cross-sectional view of a lens barrel in the direction of the optical axis according to the first embodiment of the present invention.

The embodiments of the present invention will be described below with reference to the attached drawings. FIG. 1 is a cross-sectional view of a lens barrel in the direction of the optical axis according to the first embodiment of the present invention. Referring to FIG. 1, a cam barrel 12 having a cam groove 12a is fitted in the outer periphery of a fixed barrel 11 to allow free rotation. An outer fixed barrel 13 is fixed to a fixed barrel 11 with a screw 113.

A manual focusing ring 14 is attached to the tip end of the outer fixed barrel 13 to be freely rotatable.

One end of an interlocking member 15 which serves as a manual power transmission mechanism is attached to the manual focusing ring 14 with a screw 145. Two interlocking members 15 which are provided in upper and lower parts symmetrically with respect to the optical axis therebetween are two plate-like members which extend toward the camera side. The tip end 15a of each of the interlocking members 15 is engaged between two projected portions 12b (only one is shown) which are formed in parallel in the circumferential direction on the outer peripheral of the cam barrel 12. That is, the interlocking members 15 function to couple the manual focusing ring 14 and the cam barrel 12 to rotate them together in an integrated manner.

A coupler member 18 is provided adjacent to the lower interlocking member 15 and is supported to be freely rotatable with respect to the fixed barrel 11. The coupler member 18 as a motor power transmission mechanism is provided with a gear portion 18a at the left end thereof and a connecting portion 18b at the right end thereof. The connecting portion 18b can be freely engaged with a driving portion (not shown) projected from the camera body. The gear portion 18a of the coupler member 18 is meshed with a gear portion 12c which is formed on the outer periphery of the cam barrel 12. A drive from the motor is transmitted to the cam barrel 12 through the gear portions 18a and 12c.

A lens moving frame 16 supports lens groups L10 and L20 and is fitted in the fixed barrel 11 to be movable along the optical axis. A pair of pins 17 are attached to the outer periphery of the lens moving frame 16 and fitted in a straight advancement groove 11a which is formed in the fixed barrel 11 and a cam groove 12a formed spirally in the cam member 12, respectively.

The first embodiment is different from the lens barrel of the prior art in that a projection 13b is formed on the inner periphery of the fixed barrel 13 to serve as the second limitation member. The projection 13b is formed at a position which corresponds in the direction of the optical axis to the projected portions 12b of the cam member 12, which are engaged with the tip end 15a of the interlocking member 15.

The projection 13b of the fixed barrel 13 is formed at such a position as to be brought into contact with the projected portion 12b of the cam barrel 12 at the same time as or a little later than the time when the projection 13a of the fixed barrel 13 is brought into contact with a vicinity of an installing portion of the interlocking member 15 (that is, a vicinity of a portion at which the end of the interlocking member 15 is attached to the manual focusing ring 24 with the screw 145) when the interlocking member 15 and the cam barrel 12 are rotated.

An operation of the lens barrel according to the present embodiment will be described below. First, when the photographer rotates the manual focusing ring 14, the cam barrel 12 is rotated through a pin 145 and the interlocking member 15 and the lens moving frame 16 is moved straight along the optical axis, whereby the manual focusing operation is conducted. Upon arrival of the lens moving frame 16 at the end of movement, the rotation of the manual focusing ring 14 is limited by the projected portion 13a which is formed on the inner periphery of the outer fixed barrel 13.

On the other hand, when the automatic focusing operation is conducted, the coupler member 18 which is rotatably attached to the fixed barrel 11 receives a motor drive from the camera body (not shown) so as to rotate the cam barrel 12 around the optical axis through the gear portions 18a and 12c which are provided in the coupler member 18, thereby moving the lens moving frame 6 in the direction of the optical axis. In the same manner, upon arrival of the lens moving frame 16 at the end of movement, the rotation of the cam barrel 12 is limited by the projected portion 13b which is provided in the outer fixed barrel 13.

Accordingly, whether the interlocking member 15 has been deformed or not, the rotation of the cam barrel 12 is limited at a specific position, so that the coupler member 18 can be accurately halted at a position corresponding to the end of movement of the lens moving frame 16, whereby the excessive rotation of the coupler member 18 can be prevented. It should be noted that if the coupler member 18 is halted, the motor (not shown) on the camera body side detects this halt, so that the coupler member starts to rotate reversely immediately.

Incidentally, if the contact between the projection 13b of the fixed barrel 13 and the projected portion 12b of the cam barrel 12 is to be brought about at an earlier timing than the contact between the projection 13a of the fixed barrel 13 and the interlocking member 15, when the photographer rotates manual focusing ring 14, the projection 13b is first brought into contact with the projected portion 12b. However, since the interlocking member 15 is flexible to some extent, as stated above, it is feared that when the manual focusing ring 14 is rotated by a comparatively strong power, the installing portion side of the interlocking member 15 may be rotated and moved further with respect to the tip end 15a which is limited in its rotation and movement due to the contact between the projection 13b and the projected portion 12b. The manual focusing ring 14 is rotated by such rotation of the installing portion side of the interlocking member 15, and the rotation does not stop until the projection 13a and the interlocking member are brought into contact with each other.

As stated above, when the manual focusing ring 14 is rotated, the photographer, if he feels the two contacts with the projections 13a and 13b (light vibration or resistance) through his hand griping the manual focusing ring 14, may fear or feel uncertain whether something is wrong with the lens barrel. There is also a possibility that an index indicated on the outer periphery of the manual focusing ring 14 exceeds the scale range of the outer periphery of the outer fixed barrel 13.

Accordingly, in the present embodiment, the contact between the projection 13b and the projected portion 12b of the cam barrel 12 is brought about at a later timing than that between the projection 13a and the interlocking member 15. With such arrangement, the photographer feels, when rotating the manual focusing ring 14, only one contact with the projection 13a, so that he does not feel displeasure or uncertain as stated above. On the other hand, two contacts with the projections 13a and 13b may occur when the cam barrel 12 is rotated based on the motor power supplied through the coupler member 18. However, even if such two contacts are brought about, no substantially harmful influence is exerted on the motor. Meanwhile, if the two contacts are brought about, the torque of the motor will be divided and received by the two projections 13a and 13b, whereby the projections will be prevented from damage or abrasion.

Figure 2:
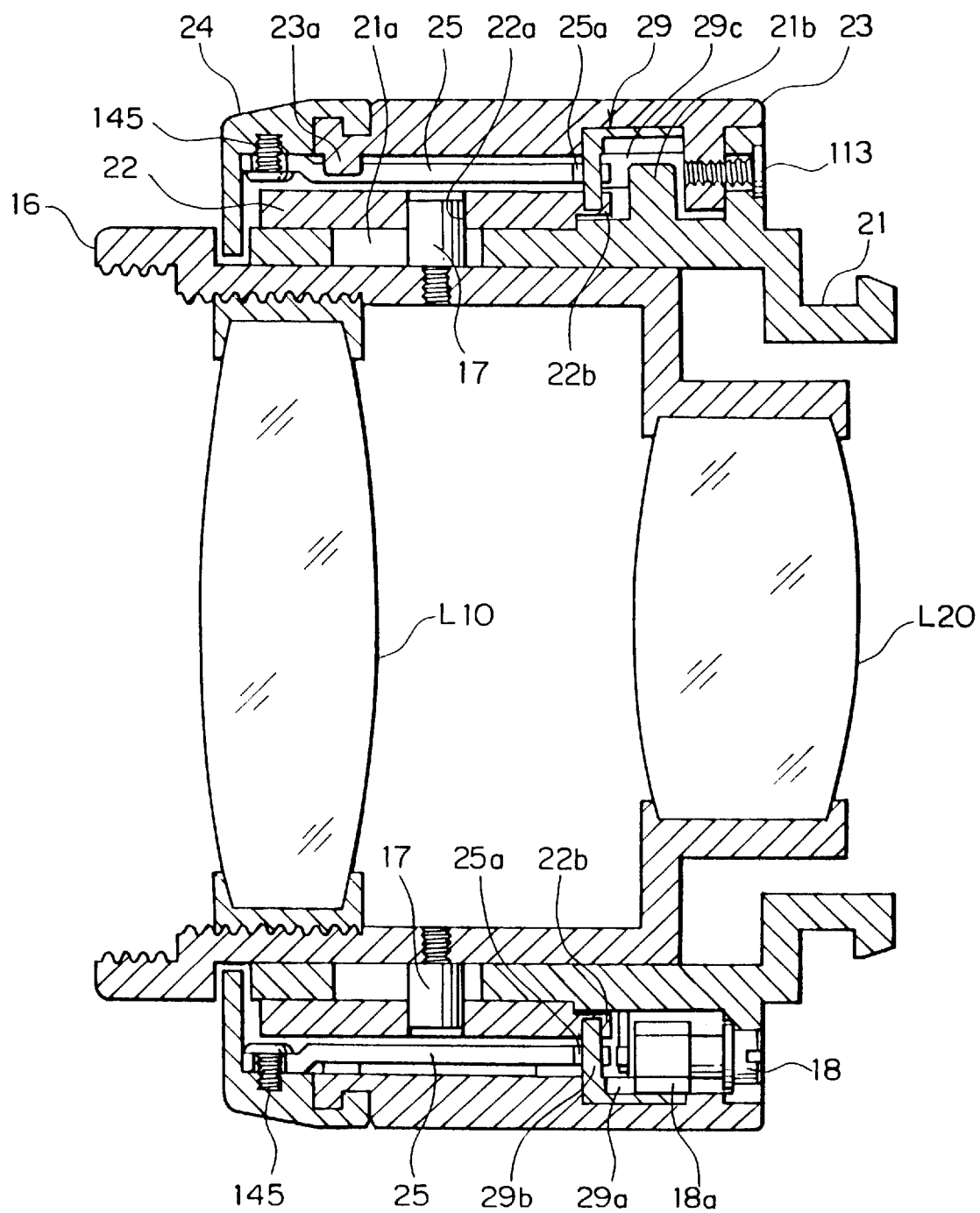
FIG. 2 is a cross-sectional view of a lens barrel in the direction of the optical axis according to the second embodiment of the present invention.
Figure 3:
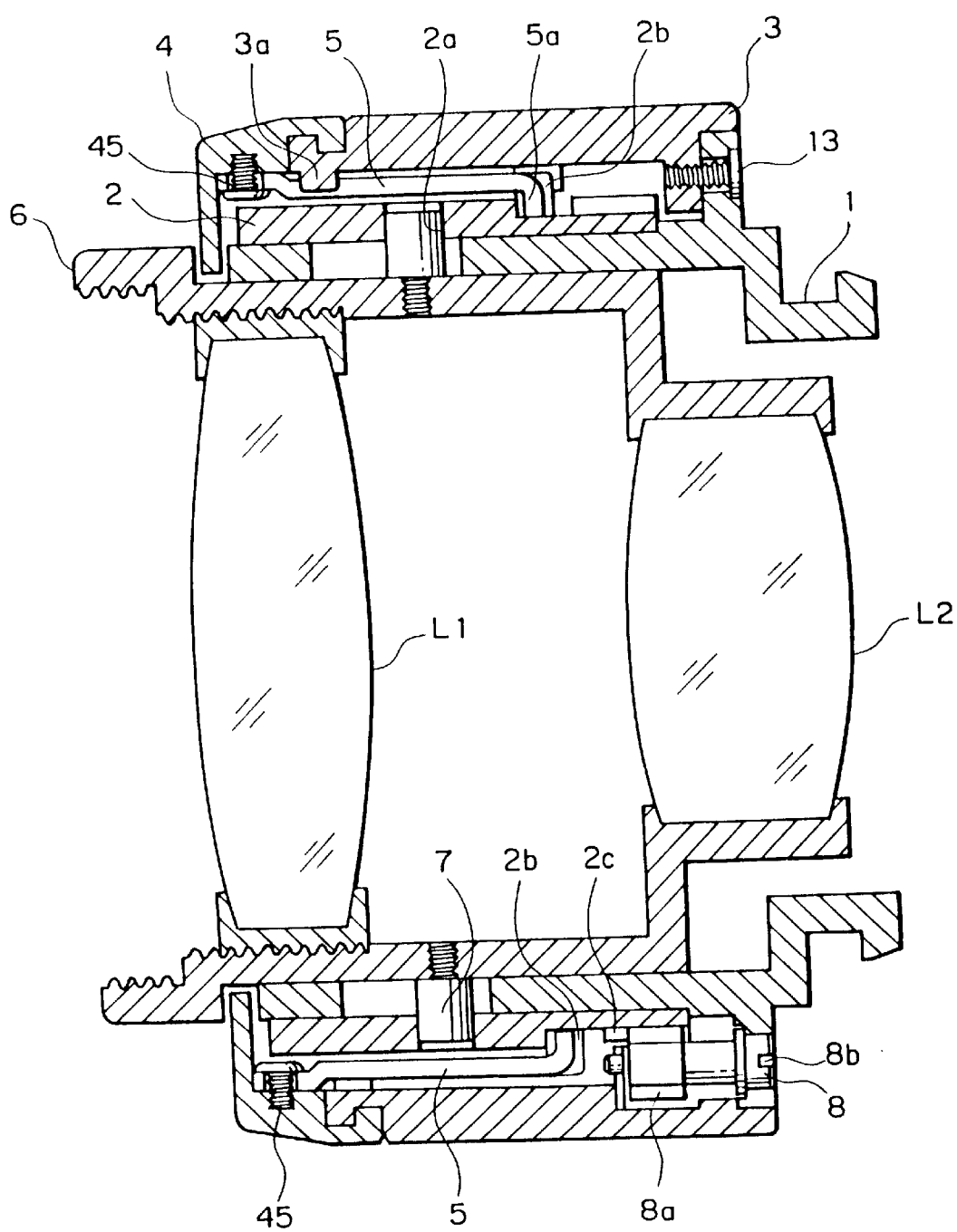
FIG. 3 is a cross-sectional view of a lens barrel in the direction of the optical axis according to the prior art.

FIG. 2 is a cross-sectional view of a lens barrel in the direction of the optical axis according to the second embodiment of the present invention. It should be noted that description will be made on the arrangements of the second embodiment of the present invention shown in FIG. 2 which are different from those of the first embodiment shown in FIG. 1, and common arrangements to the two embodiments are given the same referential numerals and description thereof will be omitted.

The first embodiment is different from the second embodiment in that a manner of power transmission from the interlocking member to the cam barrel and that from the coupler member and the cam barrel. More specifically, a partially-cylindrical gear member 29 is disposed on the inner periphery of an outer fixed barrel 23 to be freely rotatable. An inner tooth 29a of the gear member 29 is meshed with a gear portion 18a of the coupler member 18.

The gear member 29 has two pairs of projections 29b (only one projection is shown) which are aligned in the circumferential direction and symmetrical with respect to the optical axis. Each pair includes two projection extending inward at right angles with the optical axis. A projected portion 22b which extends from the right end of the cam barrel 22 is engaged between two projections forming each pair. Further, outward the projected portion 22b in a direction perpendicular to the optical axis, the tip end 25d of an interlocking member 25 is engaged between two projections 29b forming each pair in the same manner.

It is clearly seen from such structure that the interlocking member 25 and the cam barrel 22 are rotated together in an integrated manner through the gear member 29. It should be noted that, instead of the projected portion 13b in the first embodiment, a projected portion 21b which is projected from the outer periphery of the fixed barrel 21 is formed in the second embodiment. It is arranged that the rotation of the gear member 29 is limited when a stop portion 29c of the gear member 29 is brought into contact with this projected portion 21b.

An operation of the lens barrel according to the second embodiment will be described below. First, when the photographer rotates a manual focusing ring 24, the cam barrel 22 is rotated through the interlocking member 25 and the gear member 29, then the lens moving frame 16 is moved straight along the optical axis through the pin 17, whereby the manual focusing operation is conducted. Upon arrival of the lens moving frame 16 at the end of movement, the rotation of the cam barrel 22 is limited by the projected portion 21b which is formed on the fixed barrel 21.

Accordingly, since the rotation of the cam barrel 22 is limited at a specific position whether the interlocking member 25 has been deformed or not, the coupler member 18 can be accurately halted at the end of movement of the lens moving frame 16, whereby the excessive rotation of the coupler member 18 can be prevented.

It is noted that in the foregoing embodiments the limitation of rotation of the manual focusing ring and the limitation of rotation of the cam barrel were described with respect to one end of movement of the lens moving frame 16 (e.g. the infinity position) only. However, the same limitation of rotation is set with respect to the other end of movement of the lens moving frame 16 (e.g. the closest position), also.

As described above, according to the embodiments of the present invention, when a drive force is transmitted from the coupler member at the time of the automatic focusing operation, the rotation of the cam barrel is limited at the same time as, or immediately after, the time when the rotation of the manual focusing ring is limited, so that the rotation of the coupler member can be stopped immediately, whereby the inconvenience that only the coupler member is rotated after the stop of the lens movement can be removed. Further, since the coupler member is not rotated or moved for more than a designed value, interference, collision, or the like, between the components can be prevented.

According to the lens barrel of the present invention, when the motive power is transmitted from the motor power transmission mechanism, the second limitation member limits the rotation of the cam barrel even if there are deformation of the manual power transmission mechanism, backlashes, etc., whereby the excessive rotation of the cam barrel can be reduced or prevented.

What is claimed is:

1. A lens barrel comprising:

a supporting frame for supporting lens groups;

a cam barrel to be rotated around the optical axis to move said supporting frame in the direction of the optical axis;

a manual focusing ring to which the operator supplies a manual power;

a manual power transmission mechanism for transmitting the manual power supplied from said manual focusing ring to said cam barrel;

a first limitation member for inhibiting the power transmission from said manual focusing ring to said cam barrel by limiting a movement of said manual power transmission mechanism;

a motor power transmission mechanism for transmitting the motive power supplied from the motor to said cam barrel; and a second limitation member for limiting a rotation of said cam barrel, wherein when said cam barrel is rotated at least in one direction, said first limitation member limits the movement of said manual power transmission mechanism at the same time as or earlier than the time when said second limitation member limits the rotation of said cam barrel.

2. A lens barrel according to claim 1, characterized in that:

said lens barrel has a fixed barrel to be attached to the camera body;

said manual focusing ring is supported on the side of an object to be photographed of said fixed barrel to be freely rotatable;

said manual power transmission mechanism is a plate-like member which has one end fixed to said manual focusing ring to be extended toward said camera body side, and the other end to be engaged with said cam barrel to be rotated integrally with said manual focusing ring and said cam barrel; and said first limitation member is a projection on the object side formed on said fixed barrel, which projection is brought into contact with a part of said plate-like member to limit a rotation and movement of said plate-like member.

3. A lens barrel according to claim 2, characterized in that:

said second limitation member is a projection on the side of the camera body and is provided on said fixed barrel closer to said camera body than said projection on the object side; and said projection on the camera body side is brought into contact with a part of said cam barrel so as to limit a rotation of said cam barrel.

4. A lens barrel according to claim 2, characterized in that:

said second limitation member is a projection on the camera body side and is provided on said fixed barrel closer to said camera body than said projection on the object side;

said motor power transmission mechanism is provided with an external gear interlocking with said motor and an internal gear meshed with said external gear to be rotated integrally with said cam barrel; and said projection on the camera body side is brought into contact with a part of said internal gear so as to limit the rotation of said cam barrel.

5. A lens barrel comprising:

a supporting frame for supporting lens groups;

a cam barrel to be rotated around the optical axis to move said supporting frame in the direction of the optical axis within a predetermined range;

a manual focusing ring to which the operator supplies a manual power;

a manual power transmission mechanism to be moved by the manual power supplied to said manual focusing ring so as to rotate said cam barrel;

a first limitation member for inhibiting the power transmission from said manual focusing ring to said cam barrel by limiting a movement of said manual power transmission mechanism when said supporting frame is moved to a vicinity of one end of said predetermined range by the rotation of said cam barrel;

a motor power transmission mechanism for transmitting the motive power supplied from the motor to said cam barrel to rotate said cam barrel; and a second limitation member for limiting the rotation of said cam barrel, wherein said second limitation member is provided at such a position as limiting the rotation of said cam barrel at the same time as or after said first limitation member limits the movement of said manual power transmission mechanism while said supporting frame is moving toward said one end of said predetermined range.

6. A lens barrel according to claim 5, characterized in that:

said lens barrel has a fixed barrel to be attached to the camera body;

said manual focusing ring is supported to be freely rotatable on the object side of said fixed barrel;

said manual power transmission mechanism is a plate-like member which has one end fixed to said manual focusing ring to be extended toward said camera body side, and the other end to be engaged with said cam barrel to rotate said cam barrel integrally with said manual focusing ring; and said first limitation member is provided on said fixed barrel and brought into contact with a part of said plate-like member to limit the rotation of said plate-like member.

7. A lens barrel according to claim 6, characterized in that:

said second limitation member is provided on said fixed barrel closer to said camera body than said first limitation member, and is brought into contact with a part of said cam barrel so as to limit a rotation of said cam barrel.

8. A lens barrel according to claim 6, characterized in that:

said second limitation member is provided on said fixed barrel closer to said camera body than said first limitation member;

said motor power transmission mechanism is provided with an external gear which is interlocking with said motor and an internal gear which is meshed with said external gear and is rotated integrally with said cam barrel; and said second limitation member is brought into contact with a part of said internal gear to limit the rotation of said internal gear, thereby limiting the rotation of said cam barrel.

* * * * *